US006414775B1

(12) United States Patent
Pedersen

(10) Patent No.: US 6,414,775 B1
(45) Date of Patent: Jul. 2, 2002

(54) METHOD AND APPARATUS FOR MEASURING GAIN SHAPE IN AN OPTICAL REPEATER USING FM MODULATION

(75) Inventor: Bo Pedersen, Rumson, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/221,490

(22) Filed: Dec. 28, 1998

(51) Int. Cl.[7] .......................... H04B 10/00; H04B 10/02
(52) U.S. Cl. ........................ 359/177; 359/161
(58) Field of Search ................. 359/110, 133, 359/134, 160, 161, 166, 177, 187

(56) References Cited

U.S. PATENT DOCUMENTS

| | | | | |
|---|---|---|---|---|
| 5,225,922 A | * | 7/1993 | Chraplyvy et al. | 359/124 |
| 5,777,773 A | * | 7/1998 | Epworth et al. | 359/182 |
| 5,850,301 A | * | 12/1998 | Mizuochi et al. | 359/124 |
| 5,923,453 A | * | 7/1999 | Yoneyama | 359/177 |
| 5,969,833 A | * | 10/1999 | Jensen | 359/110 |
| 6,072,614 A | * | 6/2000 | Roberts | 359/177 |
| 6,151,160 A | * | 11/2000 | Ma et al. | 359/341 |
| 6,215,583 B1 | * | 4/2001 | Lagerstrom et al. | 359/341 |

* cited by examiner

Primary Examiner—Leslie Pascal
Assistant Examiner—Dalzid Singh

(57) ABSTRACT

A method and apparatus is provided for determining the gain profile of a path through an optical amplifier disposed in a first optical transmission path of an optical transmission system supporting bi-directional communication between first and second terminals along the first optical transmission path and a second optical transmission path. The method begins by generating an optical tone at a given wavelength within the bandwidth of the optical amplifier. The wavelength of the optical tone is modulated about the given wavelength. The modulated optical tone is transmitted from the first terminal along the first optical transmission path and through the optical amplifier. A portion of the modulated optical tone is received after it traverses the optical amplifier and FM to AM conversion is performed on the received portion to form an amplitude modulated optical tone. The amplitude modulated optical tone is transmitted back to the first terminal along the second transmission path via an optical loop-back path. Finally, the process is repeated for a plurality of different values of the given wavelength.

32 Claims, 4 Drawing Sheets

METHOD AND APPARATUS FOR MEASURING GAIN SHAPE IN AN OPTICAL REPEATER USING FM MODULATION

FIELD OF THE INVENTION

The present invention relates generally to a line monitoring system employed in a lightwave communication system, and more particularly to a line monitoring system that accurately determines the gain profile of an optical amplifier.

BACKGROUND OF THE INVENTION

Commercial lightwave systems use optical fibers to carry large amounts of multiplexed digital data over long distances from a transmit terminal to a receive terminal. The maximum distance that the data can be transmitted in the fiber without amplification or regeneration is limited by the loss and dispersion associated with the optical fiber. To transmit optical signals over long distances, the lightwave systems may include a number of repeaters periodically located along the fiber route from the transmit terminal to the receive terminal. Each repeater boosts the weak received signal to compensate for the transmission losses which occurred from the previous repeater. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification.

Optical amplifiers, such as rare earth doped optical fiber amplifiers, require a source of pump energy. In a rare earth doped optical fiber amplifier, for example, a dedicated pump laser is coupled to the doped fiber for exciting the active medium (rare earth element) within the amplifier. At the same time, a communication signal is passed through the doped fiber. The doped fiber exhibits gain at the wavelength of the communication signal, providing the desired amplification. If the doped optical fiber is doped with erbium, for example, pump energy may be provided at a wavelength of 1480 nm or 980 nm.

Optical communication systems often employ a line monitoring system (LMS) to monitor the performance of the repeaters. The line monitoring system includes line monitoring equipment located in the terminal and high-loss loop-back paths (HLLB) in the repeaters, which couple a portion of the optical signal back to the transmitting terminal along the opposite-going transmission path. The LME's data facilitates routine analysis to detect changes in system performance over time. In particular, useful information that may be monitored includes degradations in pump power, loss in the amplifier output stage, loss in the transmission span, and the gain profile of the amplifier (i.e., the shape of the gain as a function of wavelength across the amplifier bandwidth).

In a known line monitoring system, the gain profile is determined by transmitting an amplitude modulated (AM) probe tone at a particular optical wavelength and measuring the gain imparted to the tone. By sweeping the tone's wavelength across the optical bandwidth of the amplifier, the gain profile can be readily determined. However, the gain profile that results from this series of measurements is distorted because the tone generates cross gain modulation at wavelengths other than the tone wavelength. The cross gain modulation is caused by Raman gain and the time dynamics of the erbium doped fiber. The cross modulation caused by the Raman gain arises because the AM modulated tone in effect serves as a time-varying pump source that generates Raman gain at longer wavelengths. The cross modulation caused by the time dynamics of the fiber is also a result of the time-varying nature of the probe tone. As a result of the cross modulation the correlation between the detected AM level and the gain imparted to the probe tone is reduced. In general, the cross gain modulation causes the gain to be overestimated at shorter wavelengths and underestimated at longer wavelengths, with the least distortion occurring in the middle of the bandwidth.

The effects of cross modulation can be substantially avoided if the probe tone does not serve as a time varying pump-source. That is, cross gain modulation is reduced if the number of photons supplied by the probe tone remains constant over time, or, in other words, if the power level of the probe tone is maintained at a constant level within a limited bandwidth. In this case the effects of Raman gain and the amplifier time dynamics remain substantially constant and can be eliminated when determining the gain profile. Accordingly, the gain profile can be more accurately determined by employing a probe tone that does not undergo amplitude modulation.

SUMMARY OF THE INVENTION

The present invention provides a method and apparatus for determining the gain profile of a path through an optical amplifier disposed in a first optical transmission path of an optical transmission system supporting bi-directional communication between first and second terminals along the first optical transmission path and a second optical transmission path. The method begins by generating an optical tone at a given wavelength within the bandwidth of the optical amplifier. The wavelength of the optical tone is modulated about the given wavelength. The modulated optical tone is transmitted from the first terminal along the first optical transmission path and through the optical amplifier. A portion of the modulated optical tone is received after it traverses the optical amplifier and FM to AM conversion is performed on the received portion to form an amplitude modulated optical tone. The amplitude modulated optical tone is transmitted back to the first terminal along the second transmission path via an optical loop-back path. Finally, the process is repeated for a plurality of different values of the given wavelength.

In one embodiment of the invention, the amplitude modulated optical tone is converted to an alternating electrical bias that is applied to a pump source pumping the optical amplifier. Additionally, the wavelength modulating step may be performed over a bandwidth comparable to the spacing between adjacent carrier wavelengths of a wavelength division multiplexed signal. The wavelength modulation may be performed at a repetition rate that is translated into an AM modulation having a frequency higher than the repetition rate.

In yet another embodiment of the invention, the FM to AM conversion is performed by an interference filter. Furthermore, the step of performing FM to AM conversion may include the step of translating each cycle of the FM modulation to at least two cycles of AM modulation.

DETAILED DESCRIPTION

Figure 1:
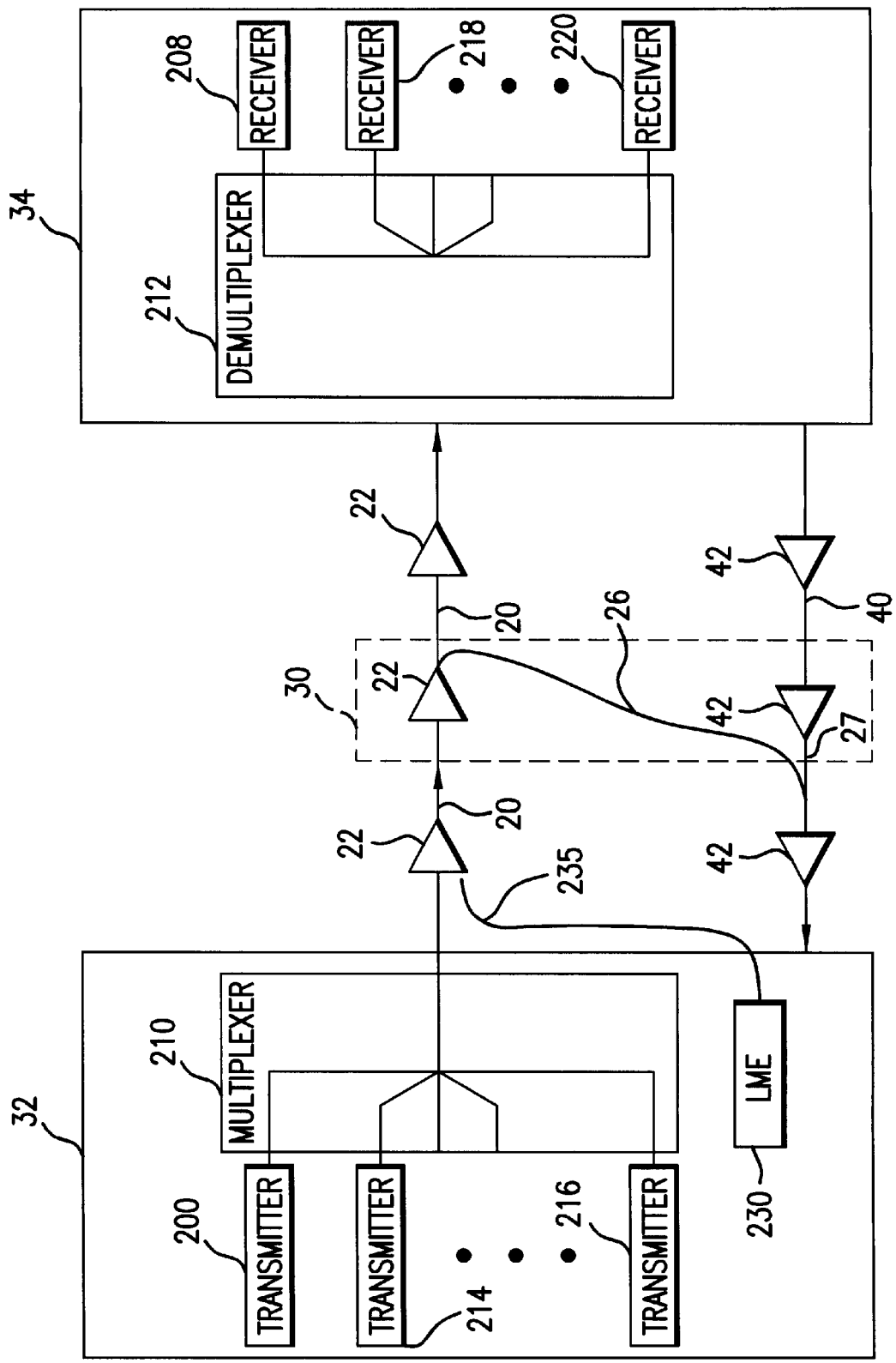
FIG. 1 shows a simplified schematic diagram of a lightwave communication system that employs optical repeaters which report status information to a requesting terminal in accordance with the present invention.

Referring to FIG. 1, there is disclosed a lightwave communication system which utilizes optical fiber amplifiers. The system includes transmitter/receiver terminals 32 and 34 and optical transmission fiber paths 20 and 40 supporting bi-directional communication. A plurality of optical amplifiers 22 and 42 are interposed in the fiber paths 20 and 40 between the transmitter/receiver terminals 34 and 32. Optical amplifiers 22 and 42 contain a length of doped fiber that provides a gain medium, an energy source that pumps the fiber to provide gain, and a means of coupling the pump energy into the doped fiber without interfering with the signal being amplified. These components of the optical amplifiers will be discussed in greater detail with respect to FIG. 2.

As shown, terminal 32 includes optical communication transmitters 200, 214 and 216 to transmit optical communications channels at wavelength $\lambda 1$, $\lambda 2$ ... $\lambda N$, respectively. Multiplexer 210 multiplexes these signals together to form a multiplexed signal that is launched into optical fiber 20 for transmission to the receiving terminal 34. At the receiving terminal 34, demultiplexer 212 demultiplexes and routes $\lambda 1$, $\lambda 2$ ... $\lambda N$ to receivers 208, 218 ... 220, respectively. Of course, in a bi-directional communication system such as shown in FIG. I, both terminals 32 and 34 serve as transmitters and receivers and hence, while not shown in FIG. 1 for purposes of clarity, each includes both transmitters and receivers.

In undersea communication systems a pair of optical amplifiers supporting opposite-traveling signals is housed in a single unit 30 (see FIG. 1) known as a repeater. The signals being transmitted from the terminals 32 and 34 are in optical form. There is no intermediate conversion to electrical form. While only three optical amplifier pairs are depicted in FIG. 1 for clarity of discussion, it should be understood by those skilled in the art that the present invention finds application in transmission paths of all lengths having many additional (or fewer) sets of such repeaters.

Each repeater includes a loop-back path through which a portion of the outgoing signal may be tapped and returned along the opposite-traveling fiber path so that repeater performance may be monitored. As shown in FIG. 1 for repeater 30, directional couplers 25 and 27 are located downstream from optical amplifiers 22 and 42, respectively. That is, a portion of the outgoing signal is coupled to the opposite-going fiber before undergoing amplification in the optical amplifiers. The couplers 25 and 27, which are typically 10 dB couplers, are connected by optical path 26. In operation, a portion of the signal traveling along optical fiber 20 is coupled to optical path 40 via loop-back path 26 and returned to terminal 32. Similarly, a portion of the signal traveling along optical fiber 40 is coupled to optical path 20 via loop-backpath 26 and returned to terminal 34.

Figure 2:
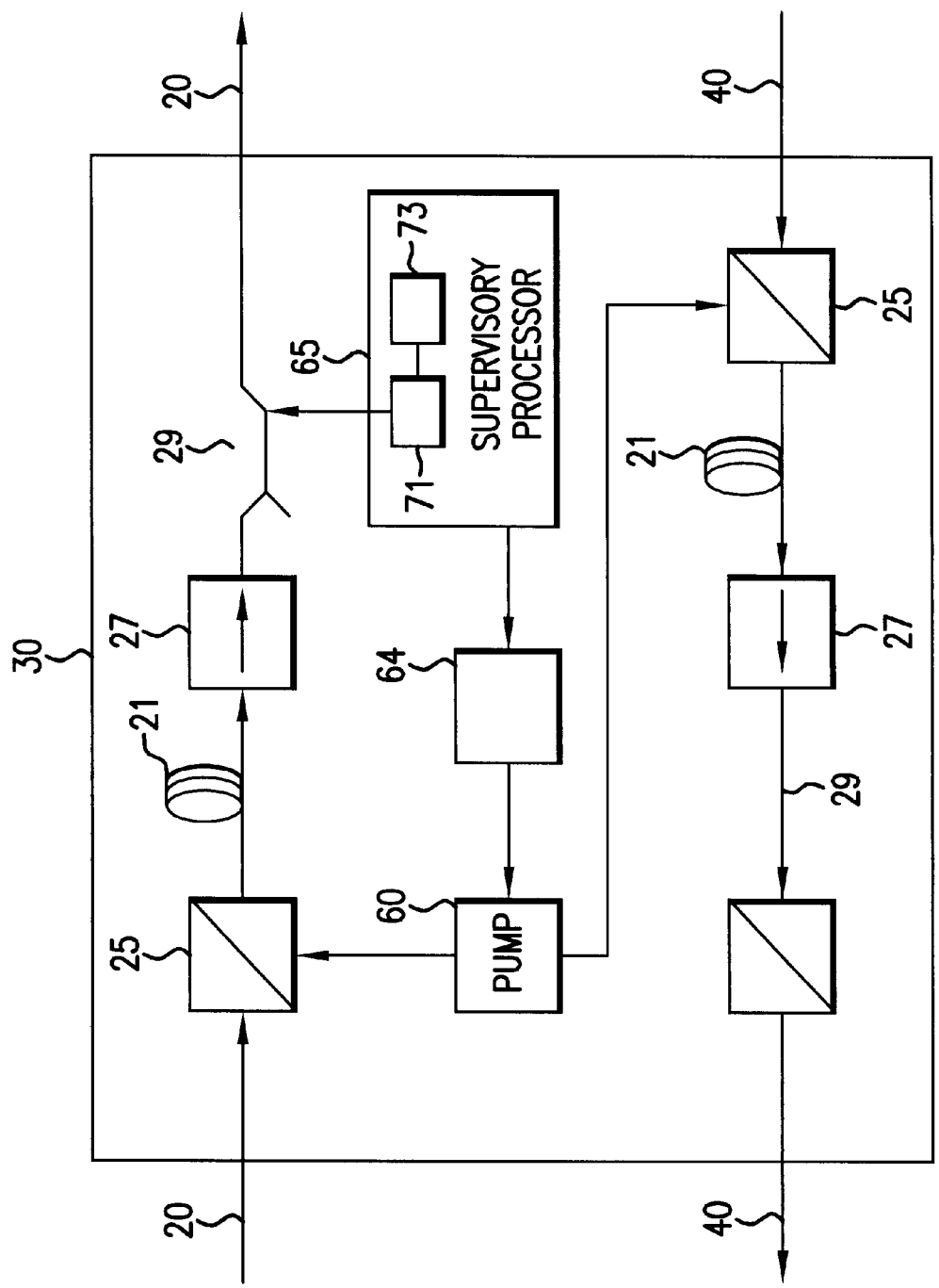
FIG. 2 shows a simplified diagram of one of the repeaters shown in FIG. 1.

Referring to FIG. 2, each optical amplifier includes a rare-earth doped optical fiber 21, such as an erbium doped fiber (EDF), coupled to a source of optical pump energy 60 via a coupler 25 such as a wavelength division multiplexer (WDM). An optical isolator 27 is typically located immediately downstream from each of the doped fibers. The isolator prevents amplified spontaneous emission, reflections, and Rayleigh backscattering from traveling back upstream and disrupting system stability by causing the amplifiers to oscillate.

Pump laser 60 provides the optical pump energy for both transmission directions of the amplifier pair. Pump laser 60 generates an optical pump beam at a suitable wavelength for producing amplification in EDF 21. For erbium doped fibers, pump wavelengths in the neighborhood of 1480 nm or 980 nm are suitable. A pump controller 64 comprises a comparator and feedback circuit for powering and controlling the pump laser 60. The receiver 65 receives a portion of the optical signal tapped by couplers 29. The pump controller 64, responsive to signals from the receiver 65, applies current to pump laser 60 to adjust the total output power generated by the pump laser 60.

As indicated in FIG. 1, the communication system includes a line monitoring system (LMS) for monitoring the optical path between terminals to determine the status of the repeaters. In particular, the LMS determines changes and failures within each span of the system, including degradations of pump power, loss in the amplifier output stage, and loss in the transmission span. In accordance with present invention, the LMS also measures the amplifier gain profile by transmitting a probe tone to the repeaters in the manner detailed below.

As shown in FIG. 1, transmitting terminal 32 includes line monitoring equipment 230 that transmits a probe tone onto the transmission path 20 via coupler 235. The tone undergoes wavelength or frequency modulation about a specific wavelength within the optical bandwidth of the optical amplifier. The modulation waveform may have a sinusoidal, sawtooth, triangular, or any other desired alternating configuration. The bandwidth of the wavelength modulation is small relative to the total bandwidth of the amplifier chain and is comparable to the channel spacing, which is typically between 0.1 and 1 nm. The power of the tone remains at a substantially constant level as it undergoes wavelength modulation. The tone is amplified in the erbium doped fiber and coupled to the receiver 65 via optical coupler 29. In an analog embodiment, of the receiver 65, the tone is directed to a FM to AM converter 71 such as an interference filter before being transformed into the electrical domain by a photodetector 73.

The tone is returned to its transmitting terminal along the HLLB path 26 indicated in FIG. 1. More specifically, with reference to FIG. 2, the AC electrical bias generated by photodetector 73 is applied to the pump controller 64, which imparts a corresponding modulation to the pump laser 60. The modulation of pump laser 60 appears as a modulation in the gain imparted by EDF 21 to the signal on transmission path 40. Accordingly, the line monitoring equipment in terminal 32 can determine the gain imparted to the probe tone by the amplifier by measuring the signal returning on transmission path 40.

Once the gain of the tone has been measured in the previously described manner for a given wavelength, another wavelength modulated probe tone is transmitted, which is centered about a different wavelength. This process continues until the entire bandwidth of the amplifier has been probed. The resulting series of gain measurements constitutes the gain profile of the optical path from the terminal to the amplifier output. Since the power of the probe tone is no longer time dependent as each gain measurement is performed, the adverse effects of cross gain modulation are substantially eliminated. Accordingly, the present invention provides a technique to more accurately determine the gain profile of the optical path to the amplifier than has been previously available.

Figure 3:
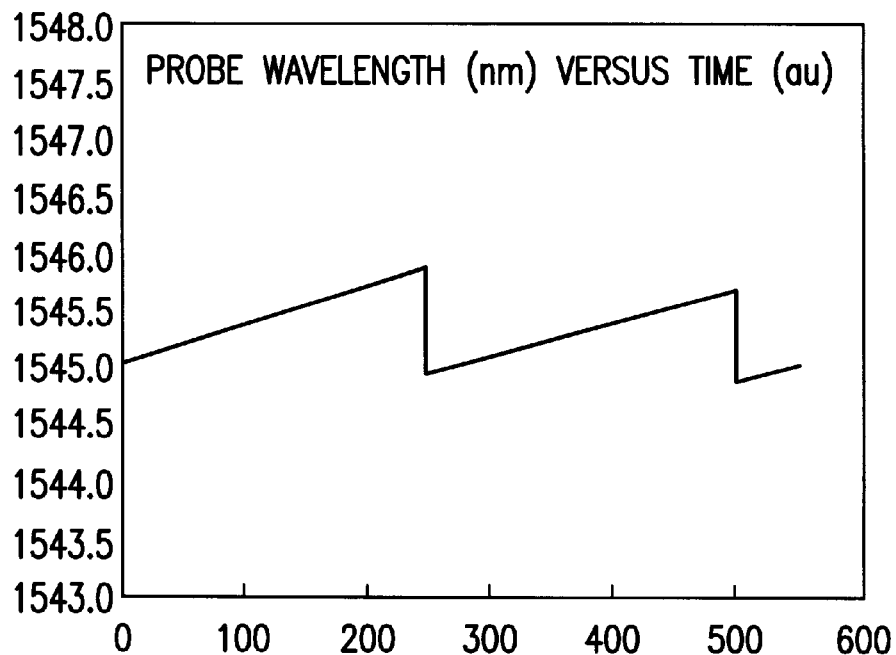
FIG. 3 shows wavelength versus time for an FM modulated probe tone.
Figure 4:
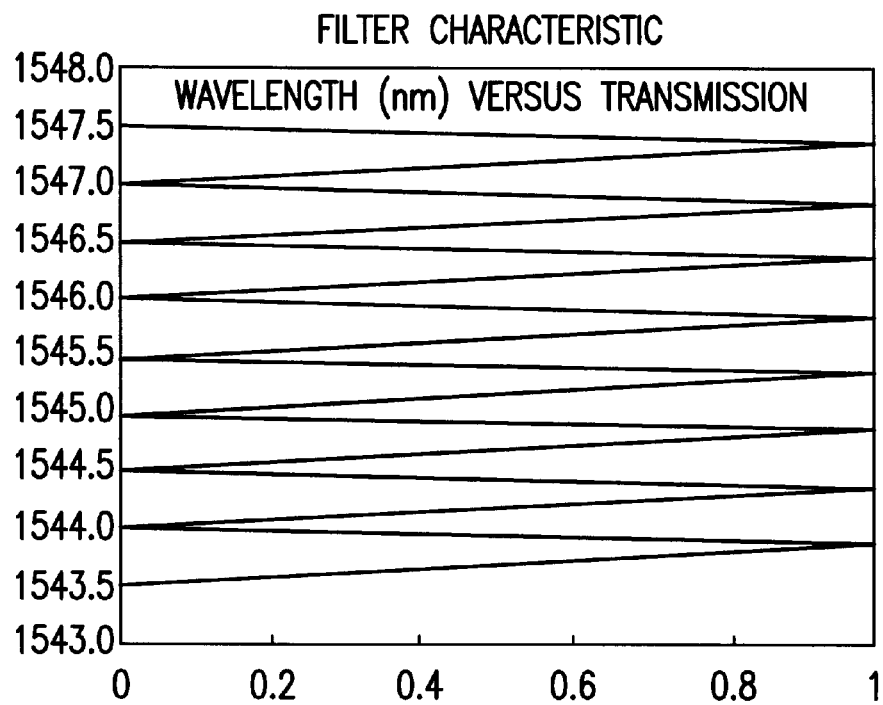
FIG. 4 shows the transfer function of an exemplary interference filter that may be employed in the present invention.
Figure 5:
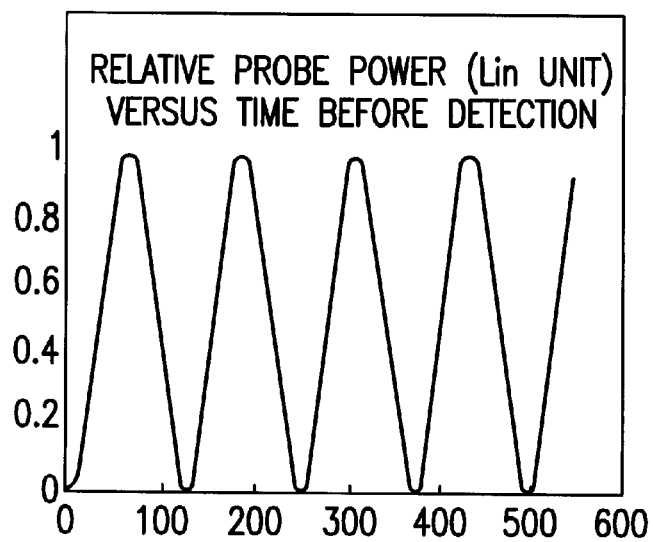
FIG. 5 shows the optical power of the probe tone after undergoing FM to AM conversion with the filter of FIG. 4.

FIG. 3 shows the wavelength versus time for an FM modulated tone centered about 1545 nm. The wavelength modulation occurs between an initial wavelength of 1545 nm and a final wavelength of 1546 nm. FIG. 4 shows the transfer function of an exemplary interference filter that may be employed to perform the FM to AM conversion. As shown, the initial and final wavelengths are located on different transmission maxima (or minima) that are two periods apart. FIG. 5 shows the probe power as a function of time after undergoing FM to AM conversion in the filter. As shown, the period of the filter's transfer function has been selected so that each cycle of the FM modulation (FIG. 3) is translated into two cycles of AM modulation (FIG. 5). That is, the frequency of the AM modulated tone is twice the repetition rate of the corresponding FM modulated tone. In general, the filter's transfer function may be arranged to provide any desired relationship between the frequency of the AM modulated tone and the frequency of the FM modulated tone.

In some embodiments of the invention it will be advantageous to select a filter that causes the FM modulation to be translated to AM modulation at a higher frequency than the repetition rate. This may be advantageous because the cross gain modulation follows the frequency modulation of the probe. That is, while the FM modulation will cause very little AM modulation, any residual AM modulation that does occur is likely to occur at the repetition rate. Thus, by converting to a higher frequency in the receiver 65, the AM modulation can be electrically filtered by a narrow waveband filter. Accordingly, if the receiver operates at a frequency greater than the FM modulation the cross gain will be rejected.

The FM modulated probe tone may be generated in the line terminal equipment by any convenient source. For example, the source may be a tunable laser, a broadband noise source with a tunable filter, a continuously tunable external cavity laser (ECL), or a distributed feedback Bragg (DFB) laser. Depending on the particular source that is employed, the wavelength modulation may even be accomplished by modulating the temperature of the laser, although the slow modulation speed of this technique may limit its applicability. Alternatively, the modulation may be performed by a high speed phase modulator that follows a tunable laser source or by an acoustic-optic modulating filter.

Figure 6:
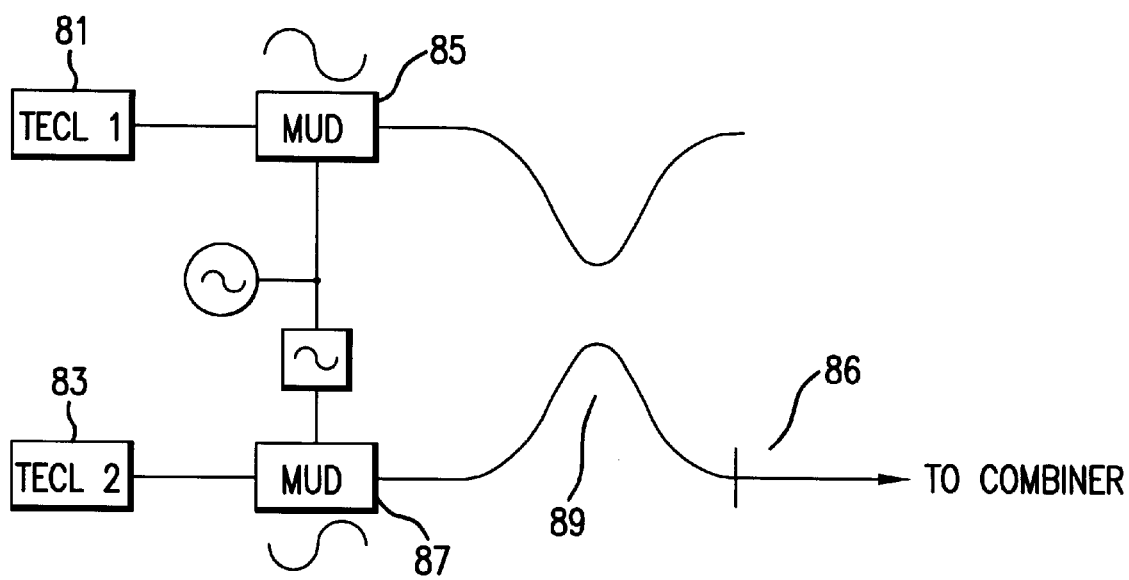
FIG. 6 shows one particular embodiment of the probe tone source that may be employed in the present invention.

In one embodiment of the invention the probe tone is generated by the arrangement shown in FIG. 6, in which the output from two tunable ECL's operating at wavelengths that are separated by a fixed value are AM modulated 180 degrees out of phase before being combined into a single output. That is, laser 81 generates optical energy at a wavelength $\lambda 1$ while laser 83 generates optical energy at a wavelength $\lambda 2$. The lasers 81 and 83 are amplitude modulated by modulators 85 and 87, respectively, which are 180 degrees out of phase. The output from the lasers 81 and 83 are combined by coupler 89 and directed along optical fiber 86 to transmission path 20 shown in FIG. 1. If the power and AM modulation from each of the lasers is properly balanced, the DC power appearing on optical fiber 86 will have a constant value, which, as previously mentioned, is necessary to reduce the cross gain modulation. The wavelengths $\lambda 1$ and $\lambda 2$ represent the extrema of the wave-length modulation of the combined output, which serves as the desired wavelength-modulated probe tone. The wavelengths $\lambda 1$ and $\lambda 2$ are selected so that one appears at a transmission maxima of the FM to AM filter 71 (see FIG. 2) and the other appears at a transmission minima of the filter 71. To determine the gain at different wavelengths, the center frequency of the resulting wavelength-modulated probe tone may be varied by sweeping the wavelengths $\lambda 1$ and $\lambda 2$ across the bandwidth of the amplifier while maintaining the difference $\lambda 1-\lambda 2$ at a constant value.

What is claimed is:

1. A method for determining the gain profile of a path through an optical amplifier disposed in a first optical transmission path of an optical transmission system supporting bi-directional communication between first and second terminals along the first optical transmission path and a second optical transmission path, said method comprising the steps of:

a. generating a supervisory optical tone at a given wavelength within the bandwidth of the optical amplifier;

b. modulating the wavelength of the optical tone about said given wavelength;

c. transmitting from the first terminal said modulated optical tone along the first optical transmission path and through the optical amplifier;

d. receiving a portion of the modulated optical tone after it traverses the optical amplifier and performing FM to AM conversion thereon to form an amplitude modulated optical tone;

e. transmitting said amplitude modulated optical tone to the first terminal along the second transmission path via optical loop-back path;

f. repeating steps (a)–(e) for a plurality of different wavelengths to obtain gain measurements associated with said different wavelengths that constitute said gain profile.

2. The method of claim 1 further comprising the step of converting the amplitude modulated optical tone to an alternating electrical bias that is applied to a pump source pumping the optical amplifier.

3. The method of claim 1 wherein the wavelength modulating step is performed over a bandwidth comparable to a spacing between adjacent carrier wavelengths of a wavelength division multiplexed signal.

4. The method of claim 1 wherein said modulation has a sinusoidal configuration.

5. The method of claim 1 wherein the step of performing FM to AM conversion is performed electrically.

6. The method of claim 5 wherein said electrical conversion is performed by a photodetector.

7. The method of claim 6 wherein said FM to AM conversion is performed by an interference filter.

8. The method of claim 1 wherein said step of performing FM to AM conversion includes the step of translating each cycle of said FM modulation to at least two cycles of AM modulation.

9. The method of claim 1 wherein said step of performing FM to AM conversion includes the step of translating each cycle of said FM modulation to a prescribed number of cycles of AM modulation.

10. The method of claim 1 wherein said wavelength modulation is performed at a repetition rate that is translated into an AM modulation haivng a frequency higher than said repetition rate.

11. The method of claim 1 wherein said modulated optical tone is generated by a tunable laser.

12. The method of claim 11 wherein said tunable laser includes a high speed phase modulator.

13. The method of claim 1 wherein said modulated optical tone is generated by a broadband noise source having a tunable filter.

14. The method of claim 1 wherein said optical tone is generated by first and second tunable lasers operating at first and second wavelengths, respectively, and further comprising the steps of amplitude modulating said first and second wavelengths 180 degrees out of phase with respect to one another and combining said amplitude modulated wavelengths to form said optical tone.

15. The method of claim 14 wherein a DC power level of said combined amplitude modulated wavelengths is substantially constant.

16. The method of claim 14 wherein said first and second wavelengths define extrema of said wavelength modulation.

17. The method of claim 16 wherein the step of performing FM to AM conversion is performed by a filter and said first wavelength corresponds to a transmission maxima of said filter and said second wavelength corresponds to a transmission minima of said filter.

18. The method of claim 16 wherein step (f) is performed by sweeping said first and second wavelengths across the bandwidth of the optical amplifier while maintaining a difference between said first and second wavelengths at a substantially constant value.

19. An apparatus for determining the gain profile of a path through an optical amplifier disposed in a first optical transmission path of an optical transmission system supporting bi-directional communication between first and second terminals along the first optical transmission path and a second optical transmission path, comprising:

an optical source for generating an optical tone at a given wavelength within the bandwidth of the optical amplifier;

a wavelength modulator for modulating the wavelength of the optical tone about said given wavelength;

means for transmitting from the first terminal said modulated optical tone along the first optical transmission path and through the optical amplifier;

a receiver for receiving a portion of the modulated optical tone after it traverses the optical amplifier;

an FM to AM converter for converting said wavelength modulated optical tone to an amplitude modulated optical tone;

means for transmitting said amplitude modulated optical tone to the first terminal along the second transmission path via an optical loop-back path of the transmission system, said transmitting means includes a photodetector for converting the amplitude modulated optical tone to an alternating electrical bias that is applied to a pump source pumping the optical amplifier.

20. The apparatus of claim 19 wherein said modulator performs wavelength modulation over a bandwidth comparable to a spacing between adjacent carrier wavelengths of a wavelength division multiplexed signal.

21. The apparatus of claim 20 wherein said modulator performs sinusoidal configuration.

22. The apparatus of claim 19 wherein said FM to AM converter is an interference filter.

23. The apparatus of claim 19 wherein said FM to AM converter is configured to translate each cycle of said FM modulation to at least two cycles of AM modulation.

24. The apparatus of claim 19 wherein said FM to AM converter is configured to translate each cycle of said FM modulation to a prescribed number of cycles of AM modulation.

25. The apparatus of claim 19 wherein said wavelength modulator is configured to perform wavelength modulation at a repetition rate that is translated into an AM modulation having a frequency higher than said repetition rate.

26. The apparatus of claim 19 wherein said optical source is a tunable laser.

27. The apparatus of claim 26, wherein said tunable laser includes a high speed phase modulator.

28. The apparatus of claim 19 wherein said optical source is a broadband noise source having a tunable filter.

29. The apparatus of claim 19 wherein said optical source includes:

first and second tunable lasers operating at first and second wavelengths, respectively;

an amplitude modulator for amplitude modulating said first and second wavelengths 180 degrees out of phase with respect to one another; and a coupler for combining said amplitude modulated wavelengths to form said optical tone.

30. The apparatus of claim 29 wherein said first and second wavelengths define extrema of said wavelength modulation.

31. The apparatus of claim 30 wherein said first wavelength corresponds to a transmission maxima of said FM to AM converter and said second wavelength corresponds to a transmission minima of said FM to AM converter.

32. A method for determining the gain profile of a path through an optical amplifier disposed in a first optical transmission path of an optical transmission system supporting bi-directional communication between first and second terminals along the first optical transmission path and a second optical transmission path, said method comprising the steps of:

a. generating a supervisory optical tone at a given wavelength within the bandwidth of the optical amplifier;

b. modulating the wavelength of the optical tone about said given wavelength;

c. transmitting from the first terminal said modulated optical tone along the first optical transmission path and through the optical amplifier;

d. receiving a portion of the modulated optical tone after it traverses the optical amplifier and performing FM to AM conversion thereon to form an amplitude modulated optical tone;

e. transmitting said amplitude modulated optical tone to the first terminal along the second transmission path via optical loop-back path;

f. converting the amplitude modulated optical tone to an alternating electrical bias that is applied to a pump source pumping the optical amplifier.

g. repeating steps (a)–(e) for a plurality of different wavelengths.

* * * * *